(12) United States Patent
Sasaki

(10) Patent No.: US 7,032,295 B2
(45) Date of Patent: Apr. 25, 2006

(54) METHOD OF MANUFACTURING A THIN-FILM MAGNETIC HEAD

(75) Inventor: Yoshitaka Sasaki, Chuo-ku (JP)

(73) Assignee: TDK Corporation, Tokyo (JP)

( * ) Notice: Subject to any disclaimer, the term of this patent is extended or adjusted under 35 U.S.C. 154(b) by 552 days.

(21) Appl. No.: 10/218,578

(22) Filed: Aug. 15, 2002

(65) Prior Publication Data

US 2002/0189079 A1 Dec. 19, 2002

Related U.S. Application Data

(62) Division of application No. 09/430,178, filed on Oct. 29, 1999, now Pat. No. 6,456,459.

(30) Foreign Application Priority Data

Nov. 12, 1998 (JP) .................................. 10-322629

(51) Int. Cl.
*G11B 5/127* (2006.01)
*B05D 5/12* (2006.01)

(52) U.S. Cl. .............................. 29/603.14; 29/603.13; 29/603.23; 427/128; 427/131

(58) Field of Classification Search ............. 29/603.07, 29/603.13, 603.14, 603.23, 603.25; 427/128, 427/131; 360/125, 126, 119, 120, 324–327, 360/317

See application file for complete search history.

(56) References Cited

U.S. PATENT DOCUMENTS

| 5,438,747 A | 8/1995 | Krounbi et al. ........... 29/603.16 |
| 5,452,164 A | 9/1995 | Cole et al. ................... 360/317 |
| 5,621,596 A | 4/1997 | Santini ........................ 360/126 |
| 5,793,578 A | 8/1998 | Heim et al. .................. 360/126 |
| 5,809,636 A | 9/1998 | Shouji et al. ............. 29/603.14 |
| 5,828,533 A | 10/1998 | Ohashi et al. ............... 360/126 |
| 5,995,342 A | 11/1999 | Cohen et al. ................ 360/126 |
| 6,130,805 A | 10/2000 | Sasaki et al. ............... 360/126 |
| 6,137,652 A | 10/2000 | Ezaki et al. ................. 360/317 |

(Continued)

FOREIGN PATENT DOCUMENTS

JP          A-7-262519          10/1995

(Continued)

OTHER PUBLICATIONS

Williams, E., "Monte Carlo Simulation of Thin Film Head Read-Write Performance", IEEE Transactions on Magnetics, vol. 26, Issue 6, pp. 3022-3026, Nov. 1990.*

*Primary Examiner*—A. Dexter Tugbang
(74) *Attorney, Agent, or Firm*—Oliff & Berridge, PLC

(57) ABSTRACT

A method of manufacturing a thin-film magnetic head may include forming a first magnetic layer, a thin-film coil, an insulating layer, a gap layer, and a second magnetic layer. The first magnetic layer may be formed to include a first pole portion and a first yoke portion. The second magnetic layer may be formed to include a second pole portion and a second yoke portion. At least part of the thin-film coil may be located on a side of the first pole portion and between the gap layer and the first yoke portion, and may be covered with the gap layer. A surface of the first pole portion that faces toward the gap layer and a surface of the insulating layer that faces toward the gap layer may together form one flat surface. An interface region between the second pole portion and the second yoke portion may be formed to face toward the one flat surface.

7 Claims, 11 Drawing Sheets

U.S. PATENT DOCUMENTS

| | | | |
|---|---|---|---|
| 6,151,193 A | 11/2000 | Terunuma et al. | 360/126 |
| 6,154,347 A | 11/2000 | Sasaki | 360/317 |
| 6,163,436 A | 12/2000 | Sasaki et al. | 360/126 |
| 6,191,916 B1 | 2/2001 | Sasaki | 360/126 |

FOREIGN PATENT DOCUMENTS

| | | | |
|---|---|---|---|
| JP | A-8-87717 | | 6/1996 |
| JP | 2000-67413 | * | 3/2000 |

* cited by examiner

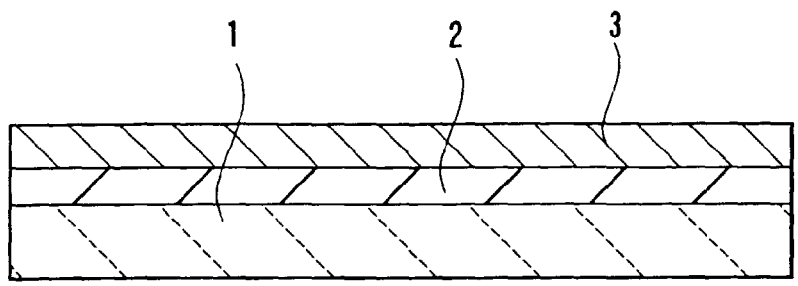
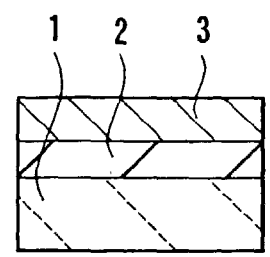
FIG. 1A  FIG. 1B
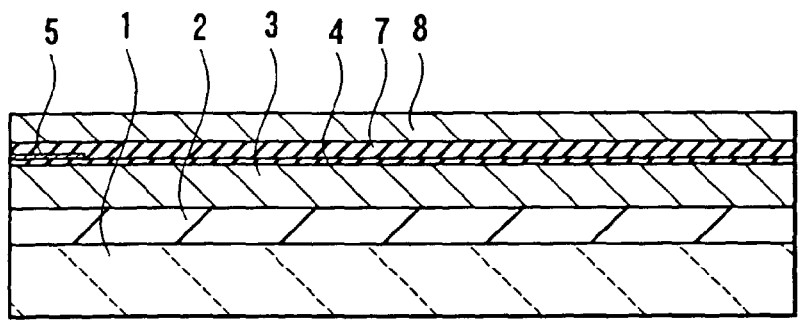
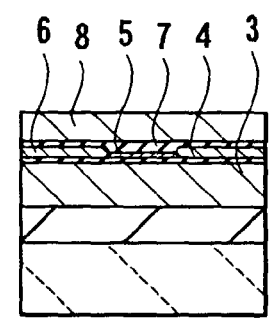
FIG. 2A  FIG. 2B
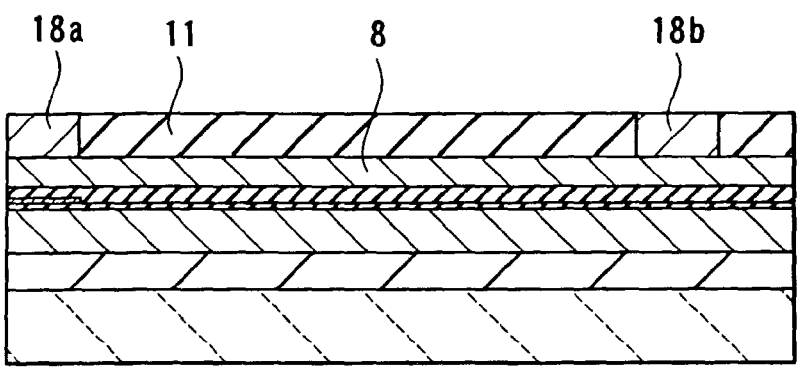
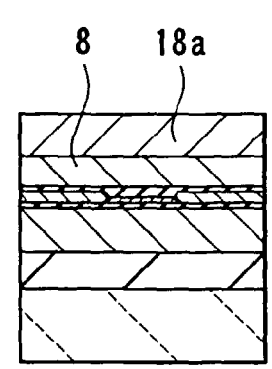
FIG. 3A  FIG. 3B

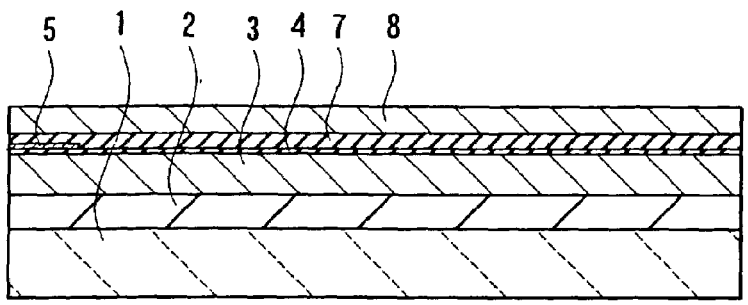 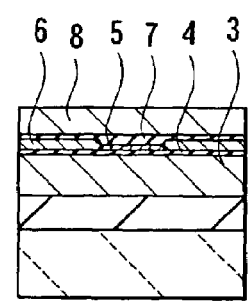
FIG. 9A            FIG. 9B
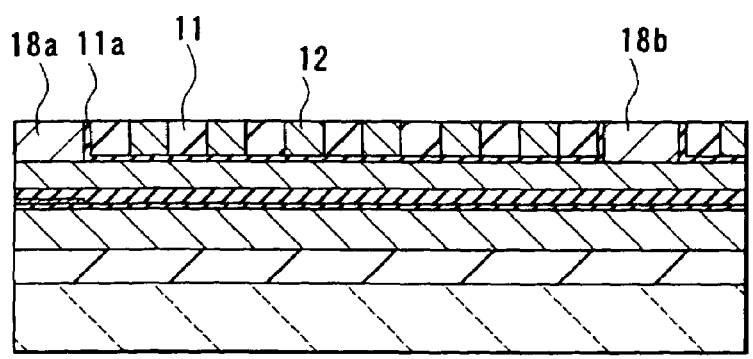 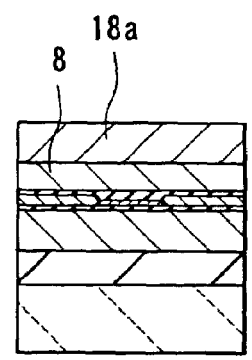
FIG. 10A           FIG. 10B

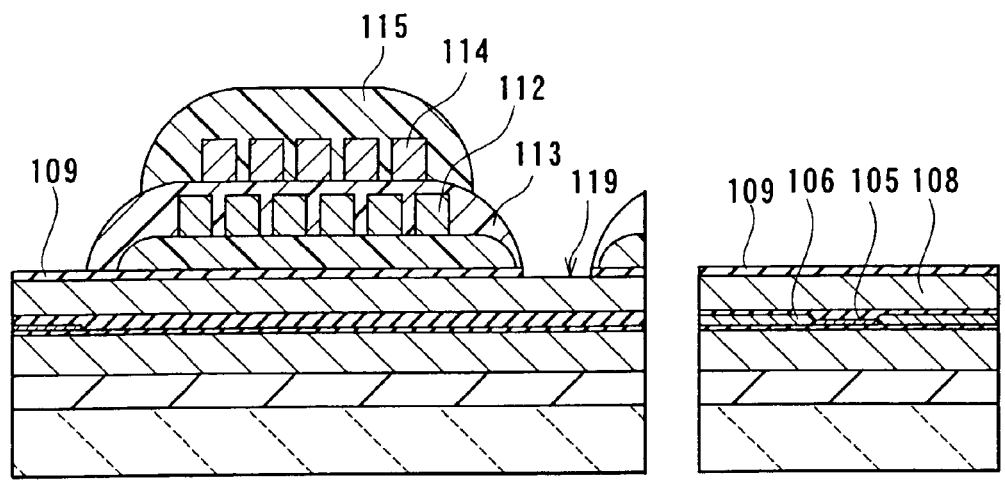
FIG. 17A
RELATED ART
FIG. 17B
RELATED ART
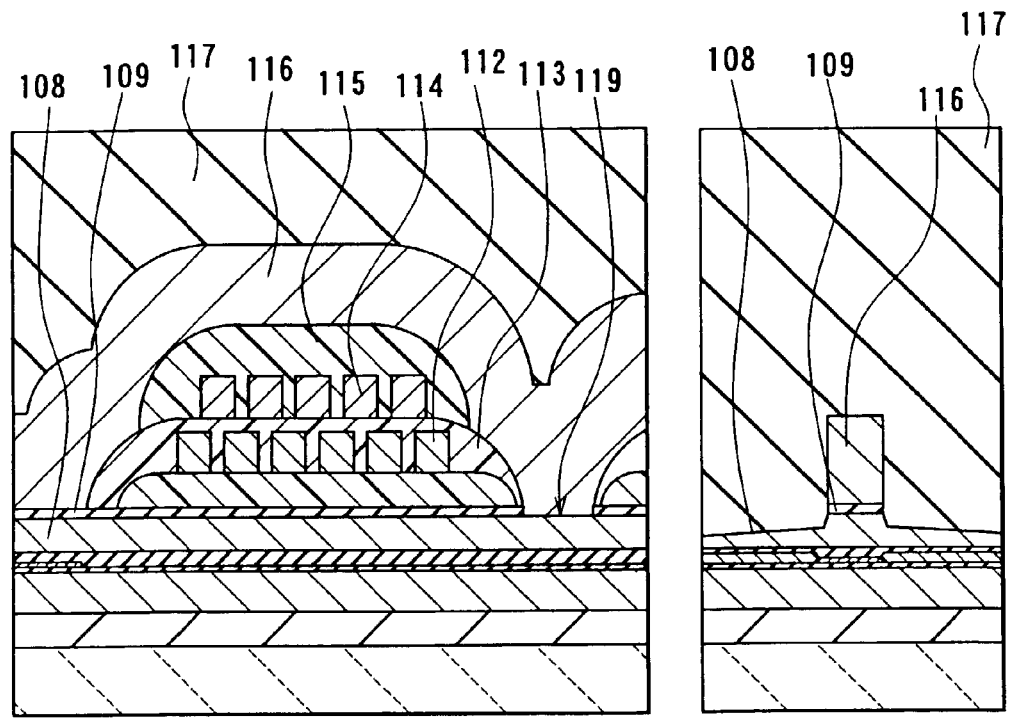
FIG. 18A
RELATED ART
FIG. 18B
RELATED ART

METHOD OF MANUFACTURING A THIN-FILM MAGNETIC HEAD

This is a Division of application Ser. No. 09/430,178 filed Oct. 29, 1999, now U.S. Pat. No. 6,456,459. The entire disclosure of the prior application is hereby incorporated by reference herein.

BACKGROUND OF THE INVENTION

1. Field of the Invention

The present invention relates to a thin-film magnetic head having at least an induction-type magnetic transducer for writing and a method of manufacturing the thin-film magnetic head.

2. Description of the Related Art

Performance improvements in thin-film magnetic heads have been sought with an increase in surface recording density of a hard disk drive. A composite thin-film magnetic head has been widely used, which is made of a layered structure including a recording head having an induction-type magnetic transducer for writing and a reproducing head having a magnetoresistive (MR) element for reading. MR elements include an anisotropic magnetoresistive (AMR) element that utilizes the AMR effect and a giant magnetoresistive (GMR) element that utilizes the GMR effect. A reproducing head using an AMR element is called an AMR head or simply an MR head. A reproducing head using a GMR element is called a GMR head. An AMR head is used as a reproducing head whose surface recording density is more than 1 gigabit per square inch. A GMR head is used as a reproducing head whose surface recording density is more than 3 gigabits per square inch.

Methods for improving the performance of a reproducing head include replacing an AMR film with a GMR film and the like made of a material or a configuration having an excellent magnetoresistive sensitivity, or optimizing the MR height of the MR film. The MR height is the length (height) between the air-bearing-surface-side end of an MR element and the other end. The MR height is controlled by an amount of lapping when the air bearing surface is processed. The air bearing surface is the surface of a thin-film magnetic head that faces a magnetic recording medium and may be called a track surface as well.

Performance improvements in a recording head have been expected, too, with performance improvements in a reproducing head. One of the factors determining the recording head performance is the throat height (TH). The throat height is the length (height) of portions of the two pole layers facing each other with a recording gap layer in between, from the air-bearing-surface-side end to the other end. A reduction in throat height is desired in order to improve the recording head performance. The throat height is controlled as well by an amount of lapping when the air bearing surface is processed.

It is required to increase the track density on a magnetic recording medium in order to increase the recording density as one of the performance characteristics of a recording head. To achieve this, it is required to implement a recording head of a narrow track structure wherein the width on the air bearing surface of a bottom pole and a top pole sandwiching the recording gap layer is reduced to the micron or submicron order. Semiconductor process techniques are employed to achieve the narrow track structure.

Reference is now made to FIG. 13A to FIG. 18A and FIG. 13B to FIG. 18B to describe an example of a method of manufacturing a composite thin-film magnetic head as a related-art method of manufacturing a thin-film magnetic head. FIG. 13A to FIG. 18A are cross sections each orthogonal to the air bearing surface of the thin-film magnetic head. FIG. 13B to FIG. 18B are cross sections of a pole portion of the head each parallel to the air bearing surface.

In the manufacturing method, as shown in FIG. 13A and FIG. 13B, an insulating layer 102 made of alumina ($Al_2O_3$), for example, having a thickness of about 5 µm is deposited on a substrate 101 made of aluminum oxide and titanium carbide ($Al_2O_3$—TiC), for example. On the insulating layer 102 a bottom shield layer 103 made of a magnetic material of 2 to 3 µm in thickness is formed for making a reproducing head.

Next, as shown in FIG. 14A and FIG. 14B, on the bottom shield layer 103, alumina, for example, is deposited to a thickness of 70 to 100 nm through sputtering to form a bottom shield gap film 104 as an insulating layer. On the bottom shield gap film 104 an MR film having a thickness of tens of nanometers is formed for making an MR element 105 for reproduction. Next, on the MR film a photoresist pattern is selectively formed where the MR element 105 is to be formed. The photoresist pattern is formed into a shape that facilitates lift-off, such as a shape having a T-shaped cross section. Next, with the photoresist pattern as a mask, the MR film is etched through ion milling, for example, to form the MR element 105. The MR element 105 may be either a GMR element or an AMR element. Next, on the bottom shield gap film 104, a pair of electrode layers 106 having a thickness of tens of nanometers are formed, using the photoresist pattern as a mask. The electrode layers 106 are electrically connected to the MR element 105.

Next, a top shield gap film 107 having a thickness of 70 to 100 nm is formed as an insulating layer on the bottom shield gap film 104 and the MR element 105. The MR element 105 is embedded in the shield gap films 104 and 107.

Next, as shown in FIG. 15A and FIG. 15B, on the top shield gap film 107, a top shield layer-cum-bottom pole layer (called a bottom pole layer in the following description) 108 having a thickness of about 3 to 3.5 µm is formed. The bottom pole layer 108 is made of a magnetic material and used for both a reproducing head and a recording head. Next, on the bottom pole layer 108, a recording gap layer 109 made of an insulating film such as an alumina film whose thickness is 0.2 to 0.3 µm is formed.

Next, as shown in FIG. 16A and FIG. 16B, a portion of the recording gap layer 109 is etched to form a contact hole 119 to make a magnetic path. On the recording gap layer 109, a photoresist layer 110 for determining the throat height is formed into a specific pattern whose thickness is about 2 µm. Next, on the photoresist layer 110, a thin-film coil 112 of a first layer is made for the induction-type recording head. The thickness of the thin-film coil 112 is about 2 µm.

Next, as shown in FIG. 17A and FIG. 17B, a photoresist layer 113 is formed into a specific pattern on the photoresist layer 110 and the coil 112. On the photoresist layer 113, a thin-film coil 114 of a second layer is then formed into a thickness of about 2 µm. Next, a photoresist layer 115 is formed into a specific pattern on the photoresist layer 113 and the coil 114. Heat treatment is then performed at a temperature of about 250° C. to flatten the surface of the photoresist layer 115.

A hill-like raised portion made up of the coils 112 and 114 and the photoresist layers 110, 113 and 115 is called an apex. The slope of the apex on the side of the air bearing surface is called an apex angle. The apex angle is generally about 45 to 55 degrees. A recording track is formed by fabricating a top pole layer on the apex.

Next, as shown in FIG. 18A and FIG. 18B, a top pole layer 116 having a thickness of about 0.5 to 1.0 μm is formed for the recording head on the recording gap layer 109 and the photoresist layers 113 and 115. The top pole layer 116 is made of a magnetic material such as Permalloy (NiFe) or FeN as a high saturation flux density material. The top pole layer 116 is in contact with the bottom pole layer 108 and magnetically coupled to the bottom pole layer 108 through the contact hole 119.

Next, the recording gap layer 109 and part of the bottom pole layer 108 are etched through ion-milling, for example, using the top pole layer 116 as a mask. Next, an overcoat layer 117 of alumina, for example, is formed to cover the top pole layer 116. The top surface of the overcoat layer 117 is flattened and pads (not shown) for electrodes are formed on the overcoat layer 117. Finally, machine processing of the slider is performed to form the air bearing surfaces of the recording head and the reproducing head. The thin-film magnetic head is thus completed. As shown in FIG. 18B, the structure is called a trim structure wherein the sidewalls of the top pole layer 116, the recording gap layer 109, and part of the bottom pole layer 108 are formed vertically in a self-aligned manner. The trim structure suppresses an increase in the effective track width due to expansion of a magnetic flux generated during writing in a narrow track.

FIG. 19 is a top view of the thin-film magnetic head manufactured as described above. The overcoat layer 117 is omitted in FIG. 19. As shown in FIG. 19, the top pole layer 116 has a pole portion 116a placed on a side of an air bearing surface 120 and a yoke portion 116b placed in a position facing the coils 112 and 114. The width of the pole portion 116a defines the recording track width. Part of the yoke portion 116b closer to the pole portion 116a tapers down to the pole portion 116a. The periphery of the tapered portion forms an angle of 45 degrees, for example, with a surface parallel to the air bearing surface 120. In FIG. 19 a numeral 108a indicates the portion where the bottom pole layer 108 is etched to form the trim structure.

In the following description the position of the air-bearing-surface-side end of the insulating layer is called a zero throat height position and indicated with TH0.

In order to achieve high surface density recording, it has been required that the recording track width, that is, the pole portion width (called pole width in the following description) is reduced. The pole portion having a width of the submicron order such as 0.5 μm or less is desired. One of the techniques that have been used for implementing such a reduced pole width is to divide the top pole layer into a pole portion and a yoke portion.

As disclosed in Japanese Patent Application Laid-open Hei 7-262519 (1995), for example, frame plating may be used as a method for fabricating the top pole layer. In this case, a thin electrode film made of Permalloy, for example, is formed by sputtering, for example, to fully cover the apex, that is, the hill-like raised portion of the coil. Next, a photoresist is applied on the electrode film and patterned through a photolithography process to form a frame to be used for plating. The top pole layer is then formed by plating through the use of the electrode film previously formed as a seed layer.

However, there is a difference in height between the apex and the other part, such as 7 to 10 μm or more. The photoresist whose thickness is 3 to 4 μm is applied to cover the apex. If the photoresist thickness is required to be at least 3 μm over the apex, a photoresist film having a thickness of 8 to 10 μm or more, for example, is formed below the apex since the fluid photoresist goes downward.

To implement a recording track width of the submicron order as described above, it is required to form a frame pattern of the submicron order through the use of a photoresist film. When the top pole layer is divided into a pole portion and a yoke portion, it is required to form not only the pole portion but also the yoke portion of the submicron order, too, if the recording track width of the submicron order is formed. Therefore, it is required to form a fine pattern of the submicron order through the use of a photoresist film having a thickness of 8 to 10 μm or more. However, it is extremely difficult to form a photoresist pattern having such a thickness into a reduced pattern width in a manufacturing process.

Furthermore, rays of light used for exposure of photolithography are reflected off the base electrode film as the seed layer. The photoresist is exposed to the reflected rays as well and the photoresist pattern may be out of shape. It is therefore impossible to obtain a sharp and precise photoresist pattern.

As thus described, it is difficult in related art to fabricate the top pole layer with accuracy if the pole width of the submicron order is required. In the case where the top pole layer is divided into the pole portion and the yoke portion, too, it is difficult to form the yoke portion with accuracy in the position corresponding to the pole portion.

For a thin-film magnetic head having surface recording density as high as 5 to 10 GB per square inch, for example, a throat height of 0.6 to 0.9 μm and a recording track width of 0.7 to 1.0 μm (the effective magnetic track width is 0.8 to 1.2 μm) are required. However, due to the above-stated reason, it is difficult in related art to control the pole width to be 0.7 to 1.0 μm (the effective magnetic track width is 0.8 to 1.2 μm).

In the related art, as shown in FIG. 19, the interface region between the pole portion 116a and the yoke portion 116b of the top pole layer 116, that is, the region where the width of the top pole layer 116 changes, is located closer to the apex than zero throat height position TH0. This is because it is difficult to form the wide yoke portion 116b on the slope of the apex. The reason will now be described. If the yoke portion 116b which is greater than the recording track in width is formed on the slope of the apex, it is required that the width of the top pole layer 116 is abruptly changed at the base of the apex from the greater width of the yoke portion 116b to the width equal to the recording track width of the submicron order. However, it is impossible to change the width in this way if the top pole layer 116 is formed through photolithography. This is because, when exposure is performed for photolithography, the rays of light reflected off the slope of the apex make it impossible to obtain a precise photoresist pattern at the base of the apex. In the related art, since the base of the apex is located at zero throat height position TH0, it is impossible to abruptly change the width of the top pole layer 116 at zero throat height position TH0. It is possible to precisely control the width of the pole portion 116a at a point 1 to 2 μm closer to the air bearing surface 120 than zero throat height position TH0.

Therefore, in the related art the throat height is increased and it is impossible to improve properties such as the overwrite property required for writing data over data already written on a recording medium, the nonlinear transition shift (NLTS), the writing property called flux rise time that indicates the rise time of a magnetic field.

In the related art the interface region between the pole portion 116a and the yoke portion 116b of the top pole layer 116 is located closer to the apex than zero throat height position TH0. Consequently, the volume of the top pole layer 116 near zero throat height position TH0 is not enough. The magnetic flux is therefore saturated near zero throat height position TH0 and the flux does not fully reach the tip of the pole portion. As a result, if the recording track width is 0.8 µm (the effective track width is 1.0 µm), for example, the value indicating the overwrite property is as low as 15 to 20 dB. It is therefore impossible to achieve an optimal overwrite property. In general, the overwrite property is required to be about 25 to 35 dB.

In the related-art thin-film magnetic head, the photoresist layer surrounding the coil defines the throat height. However, the photoresist layers of a plurality of head elements formed in one wafer are not precisely and uniformly aligned. The principal reason is that, since the photoresist layers expand when heat treatment is performed or the photoresist layers that define the throat heights are etched, too, when the seed layers of the coils are etched through ion milling, it is difficult to align the ends of the photoresist layers of a plurality of head elements in a row. The variation in alignment of a plurality of head elements in a row is 0.2 to 0.5 µm at most.

Therefore, in the related art, if the throat height of the submicron order is required, the yield is greatly reduced, due to variations in throat heights of head elements, when the air bearing surface of a bar separated from a wafer and including a row of head elements is lapped.

In Japanese Patent Application Laid-open Hei 8-87717 (1996) a thin-film magnetic head is disclosed for increasing recording track density. In the head a tip of an insulating layer on which a coil is formed is located at least 3 µm away from the zero throat height position toward a rear gap (a portion in which top and bottom pole layers are in contact with each other). Alternatively, the start point of the coil is located at least 10 µm away from the zero throat height position. However, in these structures the magnetic path length is increased, and it is impossible to achieve sufficient intensity of the write magnetic field and gradient of rise of the field with respect to time when the frequency of data to write is high. The properties of the head is thereby reduced.

SUMMARY OF THE INVENTION

It is an object of the invention to provide a thin-film magnetic head and a method of manufacturing the same for controlling a pole width with accuracy and achieving a sufficient overwrite property even when the pole width is reduced and for controlling a throat height with accuracy.

A thin-film magnetic head of the invention comprises: a first magnetic layer and a second magnetic layer magnetically coupled to each other and each including at least one layer, the first magnetic layer including a first magnetic pole portion, the second magnetic layer including a second magnetic pole portion, the pole portions being opposed to each other and placed in regions of the magnetic layers on a side of a medium facing surface that faces a recording medium; a gap layer provided between the first pole portion and the second pole portion; and a thin-film coil at least part of which is placed between the first and second magnetic layers, the coil being insulated from the first and second magnetic layers. The first magnetic layer includes the first pole portion and a first yoke portion magnetically coupled to the first pole portion. The second magnetic layer includes: the second pole portion having a width that defines a recording track width; and a second yoke portion magnetically coupled to the second pole portion and having a width greater than that of the second pole portion The head further comprises an insulating layer touching the first pole portion. An interface region between the first pole portion and the insulating layer defines a throat height. The first pole portion and the insulating layer form a flat surface that faces the gap layer. An interface region between the second pole portion and the second yoke portion is located in a position facing the flat surface made up of the first pole portion and the insulating layer. In the present invention the interface region means a region indicating the interface between the two portions. The interface region includes not only the interface line or cross-sectional surface between the two portions but also a region having a certain stretch, such as a transition region in which the shape of one portion gradually transforms toward the other portion.

A method of the invention is provided for manufacturing a thin-film magnetic head comprising: a first magnetic layer and a second magnetic layer magnetically coupled to each other and each including at least one layer, the first magnetic layer including a first magnetic pole portion, the second magnetic layer including a second magnetic pole portion, the pole portions being opposed to each other and placed in regions of the magnetic layers on a side of a medium facing surface that faces a recording medium; a gap layer provided between the first pole portion and the second pole portion; and a thin-film coil at least part of which is placed between the first and second magnetic layers, the coil being insulated from the first and second magnetic layers. The method includes: a first step of forming the first magnetic layer including the first pole portion and a first yoke portion magnetically coupled to the first pole portion, and forming an insulating layer that touches the first pole portion, an interface region between the first pole portion and the insulating layer being made to define a throat height, the first pole portion and the insulating layer being made to form a flat surface that faces the gap layer; a second step of forming the gap layer on the first pole portion and the insulating layer; a third step of forming the thin-film coil such that at least part of the coil is placed on the gap layer; a fourth step of forming the second magnetic layer on the gap layer and the coil. The second magnetic layer includes: the second pole portion having a width that defines a recording track width; and a second yoke portion magnetically coupled to the second pole portion and having a width greater than that of the second pole portion. An interface region between the second pole portion and the second yoke portion is located in a position facing the flat surface made up of the first pole portion and the insulating layer in the fourth step.

According to the thin-film magnetic head or the method of manufacturing the same of the invention, the throat height is defined and the flat surface is formed on a side of the gap layer by the first pole portion of the first magnetic layer and the insulating layer. The interface region between the second pole portion and the second yoke portion is located in a position facing the flat surface made up of the first pole portion and the insulating layer.

According to the thin-film magnetic head or the method of manufacturing the same of the invention, edges of the second yoke portion on a side of the second pole portion may extend outward in the direction of width, each forming a specific angle with edges of the second pole portion. It is preferred that the specific angle is practically 90 degrees.

According to the head or the method, the interface region between the second pole portion and the second yoke portion may be located in a position corresponding to the interface region between the first pole portion and the insulating layer.

According to the head or the method, the first pole portion and the first yoke portion may be made up of separate layers.

According to the head or the method, the second pole portion and the second yoke portion may be made up of a single layer.

According to the head or the method, the thin-film coil may be placed between the gap layer and the second yoke portion, or may be divided and placed between the gap layer and the first yoke portion and between the gap layer and the second yoke portion.

According to the head or the method, the insulating layer may be formed after the first magnetic layer is formed, and processing may be then performed to flatten the top surfaces of the first magnetic layer and the insulating layer in the first step.

Other and further objects, features and advantages of the invention will appear more fully from the following description.

BRIEF DESCRIPTION OF THE DRAWINGS

FIG. 1A and FIG. 1B are cross sections for illustrating a step in a method of manufacturing a thin-film magnetic head of a first embodiment of the invention.

FIG. 2A and FIG. 2B are cross sections for illustrating a step that follows FIG. 1A and FIG. 1B.

FIG. 3A and FIG. 3B are cross sections for illustrating a step that follows FIG. 2A and FIG. 2B.

FIG. 9A and FIG. 9B are cross sections for illustrating a step in a method of manufacturing a thin-film magnetic head of a second embodiment of the invention.

FIG. 10A and FIG. 10B are cross sections for illustrating a step that follows FIG. 9A and FIG. 9B.

FIG. 17A and FIG. 17B are cross sections for illustrating a step that follows FIG. 16A and FIG. 16B.

FIG. 18A and FIG. 18B are cross sections for illustrating a step that follows FIG. 17A and FIG. 17B.

DETAILED DESCRIPTION OF THE PREFERRED EMBODIMENTS

Figures 4A, 4B:
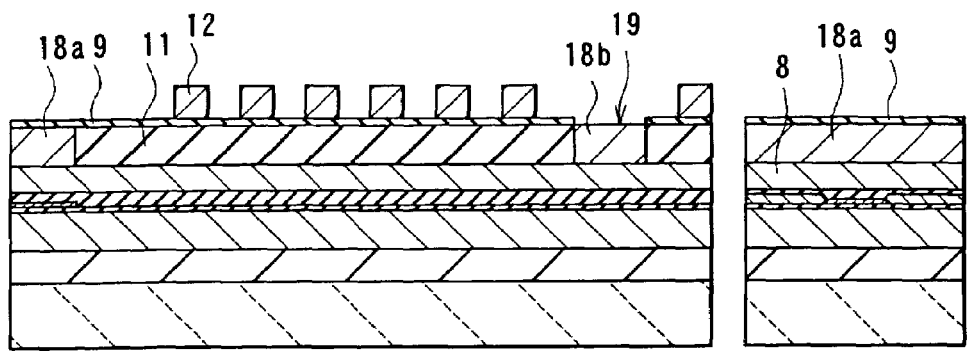
FIG. 4A and FIG. 4B are cross sections for illustrating a step that follows FIG. 3A and FIG. 3B.

Preferred embodiments of the invention will now be described in detail with reference to the accompanying drawings.

FIRST EMBODIMENT

Reference is now made to FIG. 1A to FIG. 6A, FIG. 1B to FIG. 6B, FIG. 7 and FIG. 8 to describe a method of manufacturing a composite thin-film magnetic head as a method of manufacturing a composite thin-film magnetic head of a first embodiment of the invention. FIG. 1A to FIG. 6A are cross sections each orthogonal to the air bearing surface of the magnetic head. FIG. 1B to FIG. 6B are cross sections each parallel to the air bearing surface of the pole portion of the magnetic head.

In the manufacturing method, as shown in FIG. 1A and FIG. 1B, an insulating layer 2 made of alumina ($Al_2O_3$), for example, whose thickness is about 5 µm, is deposited on a substrate 1 made of aluminum oxide and titanium carbide ($Al_2O_3$—TiC), for example. On the insulating layer 2 a bottom shield layer 3 made of a magnetic material such as Permalloy and having a thickness of about 3 µm is formed for making a reproducing head. The bottom shield layer 3 is formed through plating selectively on the insulating layer 2 with a photoresist film as a mask, for example. Next, although not shown, an insulating layer of alumina, for example, having a thickness of 4 to 6 µm, for example, is formed over the entire surface. This insulating layer is polished through chemical mechanical polishing (CMP), for example, so that the bottom shield layer 3 is exposed and the surface is flattened.

Next, as shown in FIG. 2A and FIG. 2B, on the bottom shield layer 3, alumina or aluminum nitride, for example, having a thickness of 70 to 100 nm is deposited through sputtering to form a bottom shield gap film 4 as an insulating layer. On the bottom shield gap film 4, an MR film having a thickness of tens of nanometers is formed for making an MR element 5 for reproduction. Next, on the MR film a photoresist pattern is selectively formed where the MR element 5 is to be formed. The photoresist pattern is formed into a shape that facilitates lift-off, such as a shape having a T-shaped cross section. Next, with the photoresist pattern as a mask, the MR film is etched through ion milling, for example, to form the MR element 5. The MR element 5 may be either a GMR element or an AMR element. Next, on the bottom shield gap film 4, a pair of electrode layers 6 having a thickness of tens of nanometers are formed, using the photoresist pattern as a mask. The electrode layers 6 are electrically connected to the MR element 5. Next, a top shield gap film 7 having a thickness of 70 to 100 nm is formed as an insulating layer on the bottom shield gap film 4 and the MR element 5. The MR element 5 is embedded in the shield gap films 4 and 7. Next, on the top shield gap film 7, a yoke portion 8 of a top shield layer-cum-bottom pole layer (called a bottom pole layer in the following description) having a thickness of about 1.0 to 1.5 µm is selectively formed. The bottom pole layer is made of a magnetic material and used for both a reproducing head and a recording head.

Next, as shown in FIGS. 3A and 3B, a pole portion 18a of the bottom pole layer and a magnetic layer 18b for making a magnetic path, each having a thickness of 2.0 to 2.5 µm and made of a magnetic material, are selectively formed on the yoke portion 8. The pole portion 18a is formed such that an end thereof opposite to the air bearing surface is located near an end of the MR element 5 opposite to the air bearing surface. The pole portion 18a and the magnetic layer 18b may be made of NiFe (80 weight % Ni and 20 weight % Fe), or NiFe (45 weight % Ni and 55 weight % Fe) as a high saturation flux density material through plating or may be made of a material such as FeN or FeZrN as a high saturation flux density material through sputtering. Alternatively, a material such as CoFe or a Co-base amorphous material as a high saturation flux density material may be used.

Next, an insulating layer 11 of alumina, for example, having a thickness of about 3 to 4 µm is formed over the entire surface. The insulating layer 11 is then polished through CMP, for example, until the pole portion 18a and the magnetic layer 18b are exposed to flatten the surface. In this embodiment the interface region between the pole portion 18a and the insulating layer 11 is zero throat height position TH0.

Next, as shown in FIG. 4A and FIG. 4B, a recording gap layer 9 made of an insulating material whose thickness is about 0.2 to 0.3 µm is formed on the insulating layer 11, the pole portion 18a and the magnetic layer 18b. In general, the insulating material used for the recording gap layer 9 may be alumina, aluminum nitride, a silicon-dioxide-base material, or a silicon-nitride-base material.

Next, a portion of the recording gap layer 9 on the magnetic layer 18b is etched to form a contact hole 19 for making the magnetic path.

Next, on a portion of the recording gap layer 9 on the insulating layer 11, a thin-film coil 12 of a first layer is made for the induction-type recording head. The thickness of the coil 12 is 1.5 to 2.0 µm.

Figures 5A, 5B:
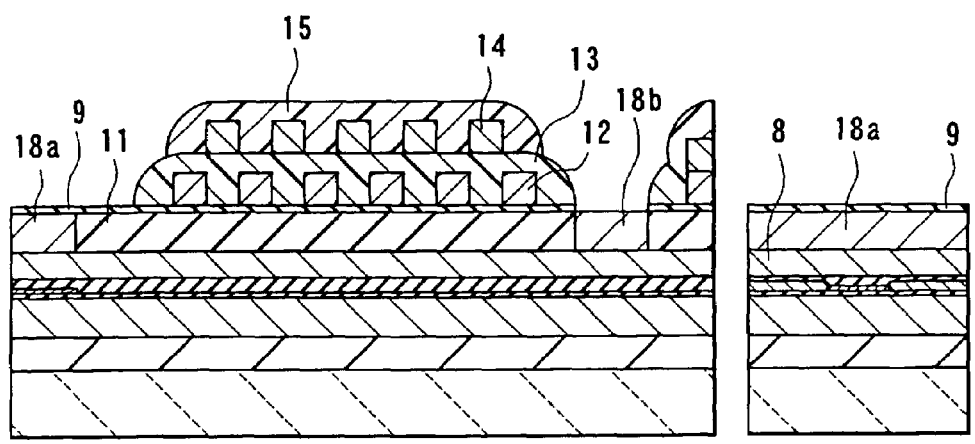
FIG. 5A and FIG. 5B are cross sections for illustrating a step that follows FIG. 4A and FIG. 4B.

Next, as shown in FIG. 5A and FIG. 5B, a photoresist layer 13 is formed into a specific pattern on the recording gap layer 9 and the coil 12. Heat treatment is then performed at a temperature of 250° C., for example, to flatten the surface of the photoresist layer 13. Next, on the photoresist layer 13, a thin-film coil 14 of a second layer is formed into a thickness of 1.5 to 2.0 µm, for example. A photoresist layer 15 is then formed into a specific pattern on the photoresist layer 13 and the coil 14. Heat treatment is then performed at a temperature of 250° C., for example, to flatten the surface of the photoresist layer 15.

Figures 6A, 6B:
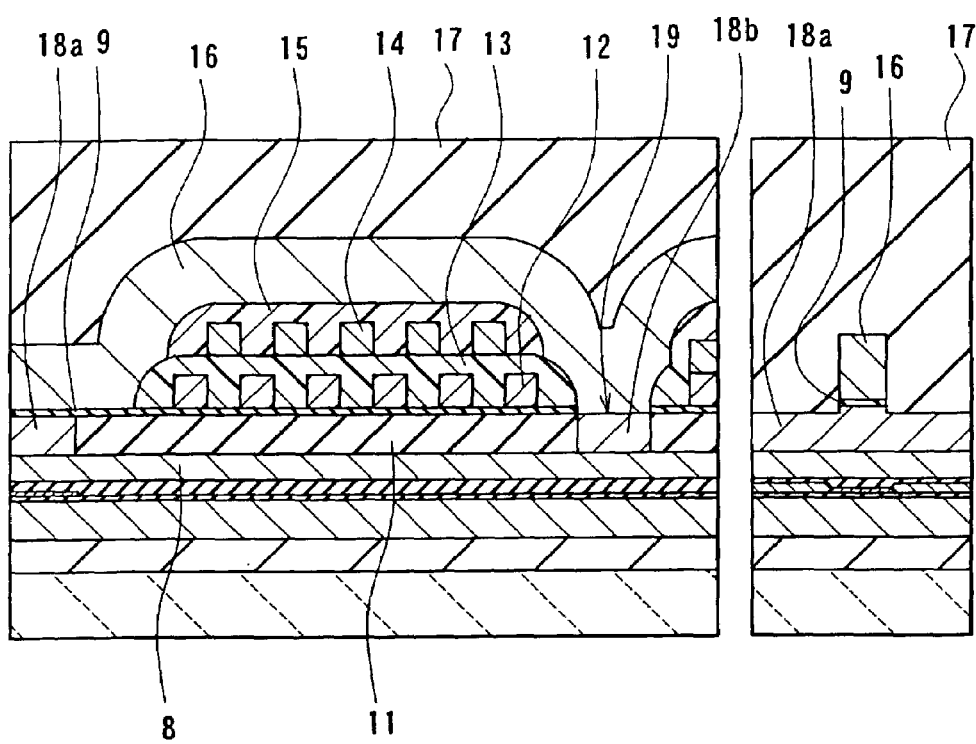
FIG. 6A and FIG. 6B are cross sections for illustrating a step that follows FIG. 5A and FIG. 5B.

Next, as shown in FIG. 6A and FIG. 6B, a top pole layer 16 made of a magnetic material and having a thickness of about 2 to 4 µm, for example, is formed for the recording head on the recording gap layer 9 and the photoresist layers 13 and 15. The top pole layer 16 is in contact with the magnetic layer 18b and magnetically coupled to the magnetic layer 18b through the contact hole 19. The top pole layer 16 may be made of NiFe (80 weight % Ni and 20 weight % Fe), or NiFe (45 weight % Ni and 55 weight % Fe) as a high saturation flux density material through plating or may be made of a material such as FeN or FeZrN as a high saturation flux density material through sputtering. Alternatively, a material such as CoFe or a Co-base amorphous material as a high saturation flux density material may be used. To improve the high frequency characteristic, the top pole layer 16 may be made of a plurality of layers of inorganic insulating films and magnetic layers such as those of Permalloy.

Next, the recording gap layer 9 is selectively etched through dry etching, using the top pole layer 16 as a mask. The dry etching may be a reactive ion etching (RIE) using a gas such as $BCl_2$, $Cl_2$, $CF_4$, or $SH_6$. Next, the pole portion 18a of the bottom pole layer is selectively etched by about 0.3 to 0.6 µm through argon ion milling, for example. A trim structure as shown in FIG. 6B is thus formed. The trim structure suppresses an increase in the effective track width due to expansion of a magnetic flux generated during writing in a narrow track. Next, an overcoat layer 17 of alumina, for example, having a thickness of 20 to 40 µm is formed to cover the top pole layer 16. The surface of the overcoat layer 17 is then flattened and pads (not shown) for electrodes are formed on the overcoat layer 17. Finally, lapping of the slider is performed to form the air bearing surfaces of the recording head and the reproducing head. The thin-film magnetic head of the embodiment is thus completed.

In this embodiment the bottom pole layer (8 and 18a) corresponds to a first magnetic layer of the invention. The top pole layer 16 corresponds to a second magnetic layer of the invention.

Figure 7:
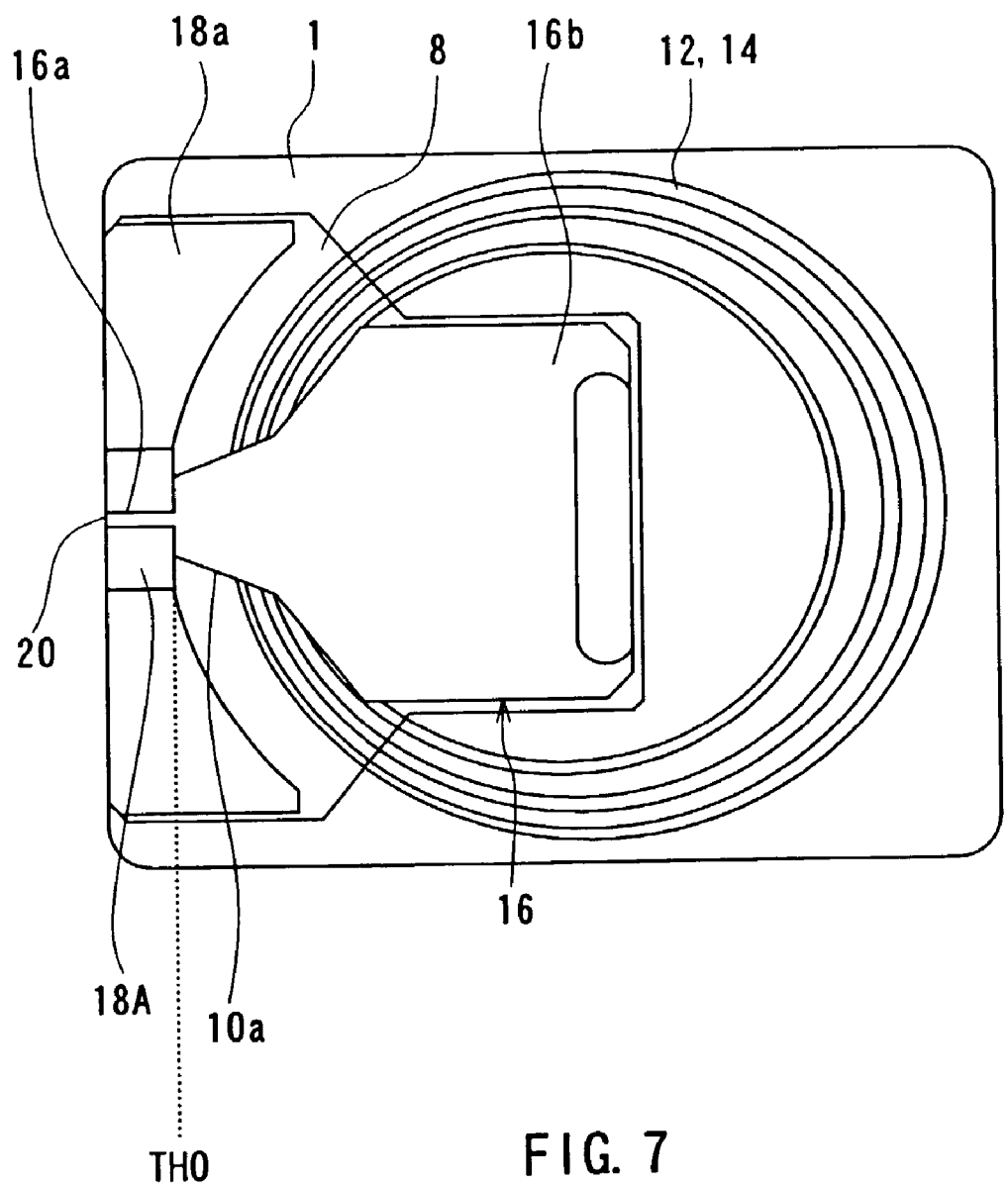
FIG. 7 is a top view of the thin-film magnetic head of the first embodiment.
Figure 8:
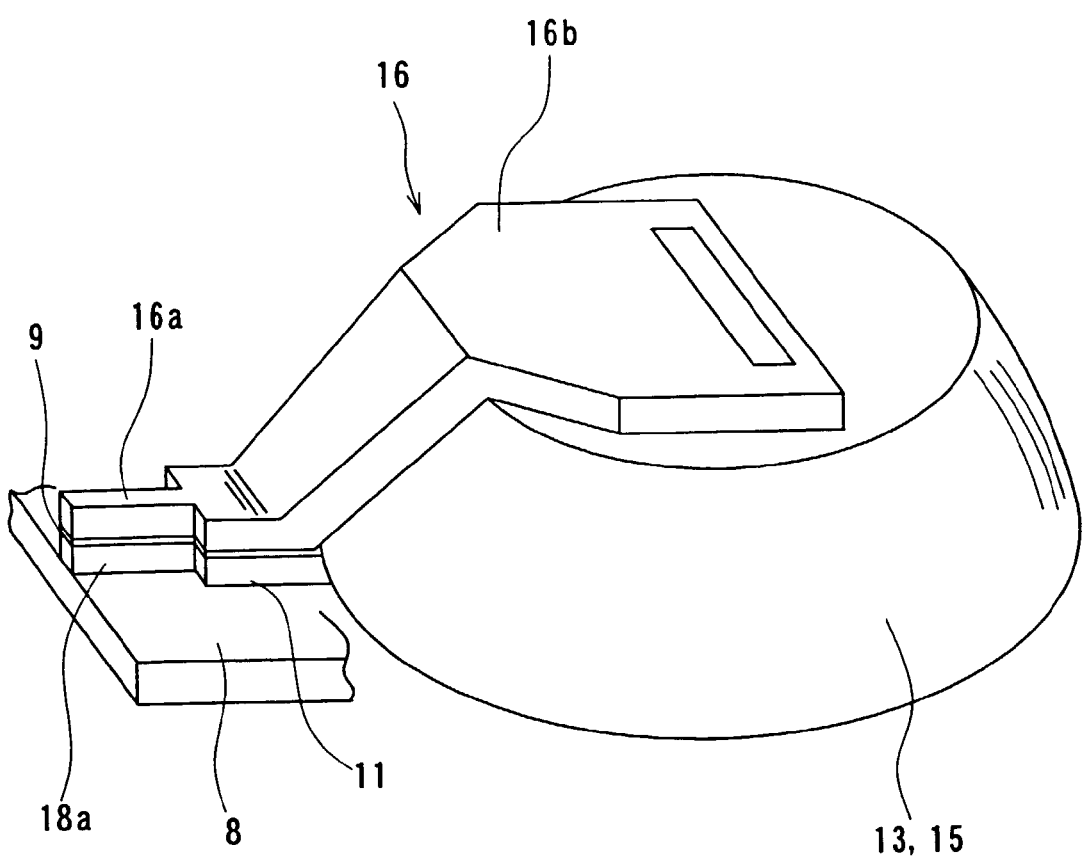
FIG. 8 is a perspective view of the thin-film magnetic head of the first embodiment.

FIG. 7 is a top view of the thin-film magnetic head of the embodiment manufactured as described above. FIG. 8 is a perspective view of the thin-film magnetic head. The overcoat layer 17 is omitted in FIG. 7 and FIG. 8. In FIG. 7 numeral 18A indicates the portion of the pole portion 18a of the bottom pole layer etched to form the trim structure.

As shown in FIG. 7 and FIG. 8, the top pole layer 16 has: the pole portion 16a located on a side of an air bearing surface 20; and the yoke portion 16b located in a position facing the coils 12 and 14. The width of the pole portion 16a defines the recording track width. The width of the yoke portion 16b is greater than that of the pole portion 16a. A portion of the yoke portion 16b closer to the pole portion 16a is tapered down to the pole portion 16a.

In this embodiment the pole portion 18a of the bottom pole layer and the insulating layer 11 touching the pole portion 18a form a flat surface that faces the recording gap layer 9. The position of the interface region between the pole portion 18a and the insulating layer 11 is zero throat height position TH0. In this embodiment the base of the apex made up of the photoresist layers 13 and 15 for insulating the coils 12 and 14 is located at a distance of 2 to 3 µm, for example, from zero throat height position TH0 toward the direction opposite to the air bearing surface 20.

The interface region between the pole portion 16a and the yoke portion 16b of the top pole layer 16 is located in a position facing the flat surface made up of the pole portion 18a of the bottom pole layer and the insulating layer 11, that is, on the flat recording gap layer 9. In this embodiment, in particular, the interface region between the pole portion 16a and the yoke portion 16b of the top pole layer 16 is located in the position corresponding to the interface region between the pole portion 18a of the bottom pole layer and the insulating layer 11, that is, zero throat height position TH0.

In this embodiment, edges of the yoke portion 16b of the top pole layer 16 closer to the pole portion 16a each form a specific angle with edges of the pole portion 16a, and extend outward in the direction of width. It is preferred that the specific angle is practically 90 degrees. 'Practically 90 degrees' means that the value of the pattern design of the top pole layer 16 is 90 degrees. This includes a slight shift from 90 degrees due to the photoresist pattern getting out of shape and so on.

In the embodiment thus described, the interface region between the pole portion 16a and the yoke portion 16b of the top pole layer 16 is placed on the flat surface. As a result, the pole portion 16a that defines the recording track width is formed with accuracy. Furthermore, the interface region between the pole portion 16a and the yoke portion 16b of the top pole layer 16 is located about 2 to 3 µm away from the base of the apex. This configuration reduces the effect of rays of light reflected off the apex in slanting and lateral directions on the photoresist pattern for making the pole portion 16a in the photolithography process. The pole portion 16a is formed with accuracy in this respect, too. Therefore, according to the embodiment, the pole width is precisely controlled even if the recording track width is reduced to the submicron order or less.

In the embodiment the edges of the yoke portion 16b of the top pole layer 16 closer to the pole portion 16a each form a specific angle which is preferably 90 degrees with the edges of the pole portion 16a, and extend outward in the direction of width. As a result, the embodiment allows the pole width to be more precisely controlled even if the pole width is reduced. The reason will be described below.

To fabricate the top pole layer 16, a photoresist is selectively exposed through the use of a mask and patterned in a photolithography process. In this case, rays of light reflected off the apex in slanting and lateral directions cause a problem in the related art. In the embodiment of the invention the top pole layer 16 is formed such that the edges of its portion near zero throat height position TH0 extend outward in the direction of width. Consequently, most of rays of light reflected off the apex in slanting and lateral directions will not reach the region where the pole portion 16a is to be formed from the edges extending outward in the direction of width. The effect of such reflected rays on the region where the pole portion 16a is to be formed is therefore reduced. As a result, it is possible to suppress an increase in the photoresist pattern width in the region.

According to the embodiment thus described, the pole portion 16a having a specific width is formed even when the pole width is reduced.

According to the embodiment, the throat height is defined not by the photoresist layer surrounding the coils but by the interface region between the pole portion 18a of the bottom pole layer and the insulating layer 11 made of alumina and the like. The pole portion 18a is fabricated with precision by patterning through plating, for example. As a result, the throat heights of a plurality of head elements aligned in a row in a wafer are made uniform. Furthermore, the pole portion 18a will not expand when heat treatment is performed on the photoresist layer for insulating the coil. In addition, since the pole portion 18a is surrounded by the insulating layer 11, it is impossible that the pole portion 18a is deformed when the seed layer of the coil is etched through ion milling. As a result, the position of the interface region between the pole portion 18a and the insulating layer 11 will not be changed. According to the embodiment thus described, even when the throat heights of the submicron order or less are required, it is possible to make uniform throat heights with precision. Yields of products are thereby improved.

According to the embodiment, the interface region between the pole portion 16a and the yoke portion 16b of the top pole layer 16 is located in zero throat height position TH0. It is therefore possible to increase the volume of part of the magnetic layer in the neighborhood of zero throat height position TH0. It is thereby possible to prevent magnetic flux saturation in the neighborhood of zero throat height position TH0. As a result, according to the embodiment, a sufficient overwrite property is obtained even when the pole width is reduced. In particular, through making the pole portion 16a of the top pole layer 16 and the pole portion 18a of the bottom pole layer each of a high saturation flux density material, the magnetic flux is made to effectively reach the pole portions without saturating before reaching there. It is thus possible to implement effective recording heads with a low loss of magnetomotive force.

According to the embodiment, the fine top pole layer 16 is made of a single layer. Manufacturing costs are therefore reduced.

According to the embodiment, the inorganic insulating layer 11 that is thin and provides sufficient insulation strength is formed between the coils 12 and 14 and the yoke portion 8 of the bottom pole layer. As a result, the insulation between the coils 12 and 14 and the bottom pole layer is improved and the yield is improved. In addition, leakage flux from the coils 12 and 14 is reduced.

In related art the distance between the outermost end of the coil and the zero throat height position is increased, due to the sloped portion of the photoresist pattern that is placed below the coils and defines the throat height. In the embodiment of the invention, in contrast, the coil 12 is formed on the flat recording gap layer 9. Consequently, it is impossible that the distance between the outermost end of the coil and the zero throat height position is increased as stated above. Therefore, according to the embodiment, the magnetic path length is reduced. The magnetic path length may be reduced by about 20 percent, for example, compared to the case where the photoresist pattern defining the throat height is located below the coil. As a result, the high frequency characteristic is improved.

SECOND EMBODIMENT

Reference is now made to FIG. 9A to FIG. 12A and FIG. 9B to FIG. 12B to describe a second embodiment of the invention. FIG. 9A to FIG. 12A are cross sections each orthogonal to the air bearing surface of a thin-film magnetic head. FIG. 9B to FIG. 12B are cross sections each parallel to the air bearing surface of the pole portion of the magnetic head.

In the manufacturing method of the second embodiment, the steps taken until the yoke portion 8 of the bottom pole layer is formed, as shown in FIG. 9A and FIG. 9B, are similar to those of the first embodiment. In the second embodiment, as shown in FIG. 10A and FIG. 10B, the pole portion 18a of the bottom pole layer and the magnetic layer 18b for making a magnetic path, each made of a magnetic material and having a thickness of 2.0 to 2.5 μm, are selectively formed on the yoke portion 8.

Next, an insulating layer 11a made of alumina, for example, and having a thickness of about 0.3 to 0.7 μm is formed on the yoke portion 8. On the insulating layer 11a, the thin-film coil 12 of a first layer having a thickness of about 1.5 to 2.0 μm is formed. Next, the insulating layer 11 made of alumina, for example, and having a thickness of about 3 to 5 μm, is formed over the entire surface. The insulating layer 11 is polished through CMP, for example, until the surfaces of the pole portion 18a and the magnetic layer 18b are exposed, and flattened. In this embodiment, the interface region between the pole portion 18a and the insulating layer 11a is zero throat height position TH0.

Figures 11A, 11B:
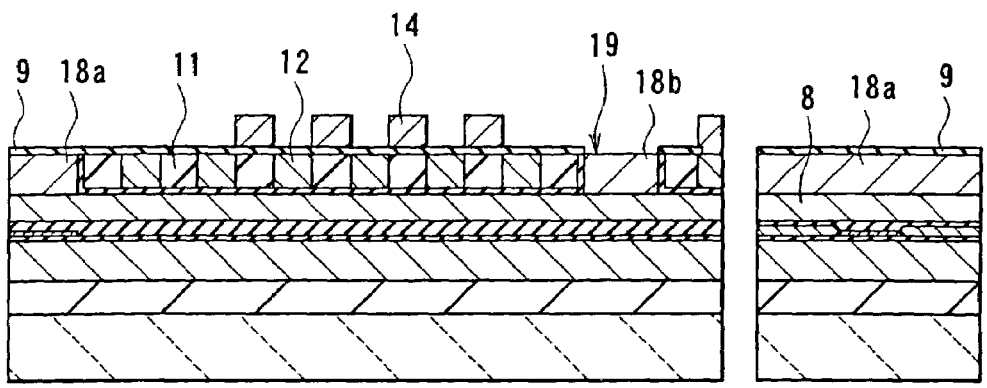
FIG. 11A and FIG. 11B are cross sections for illustrating a step that follows FIG. 10A and FIG. 10B.

Next, as shown in FIG. 11A and FIG. 11B, the recording gap layer 9 made of an insulating material whose thickness is about 0.2 to 0.3 μm is formed on the insulating layer 11, the pole portion 18a and the magnetic layer 18b. Next, a portion of the recording gap layer 9 on the magnetic layer 18b is etched to form the contact hole 19 for making a magnetic path. Next, on the recording gap layer 9, the thin-film coil 14 of the second layer having a thickness of 1.5 to 2.0 μm, for example, is formed.

Figures 12A, 12B:
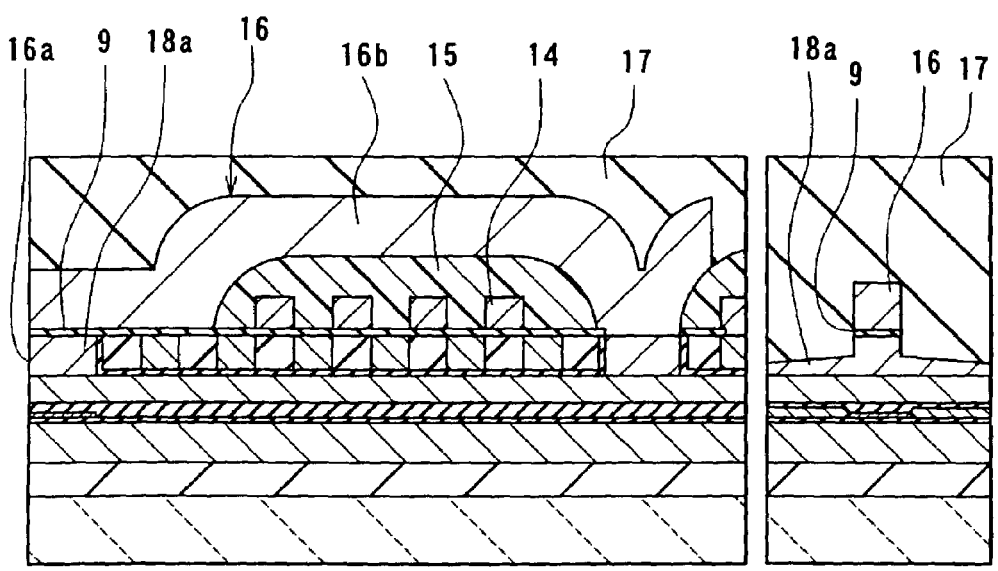
FIG. 12A and FIG. 12B are cross sections for illustrating a step that follows FIG. 11A and FIG. 11B.
Figure 13A:
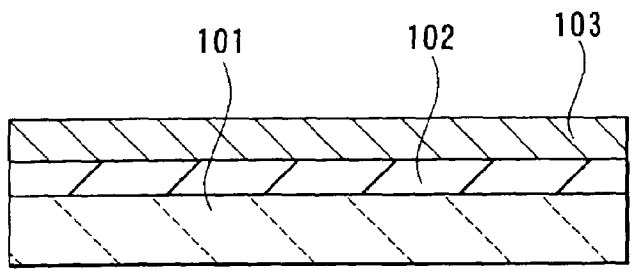
FIG. 13A and FIG. 13B are cross sections for illustrating a step in a method of manufacturing a thin-film magnetic head of related art.
Figure 13B:
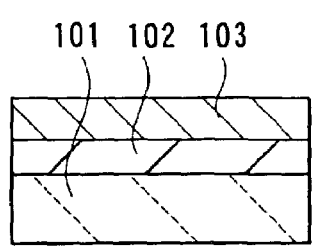
Figure 14A:
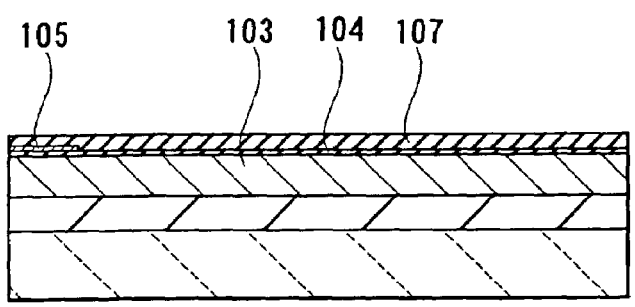
FIG. 14A and FIG. 14B are cross sections for illustrating a step that follows FIG. 13A and FIG. 13B.
Figure 14B:
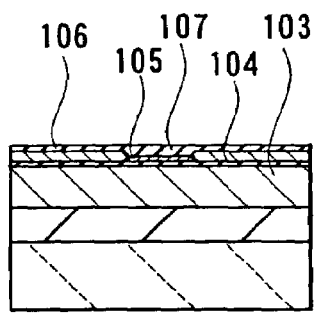
Figure 15A:
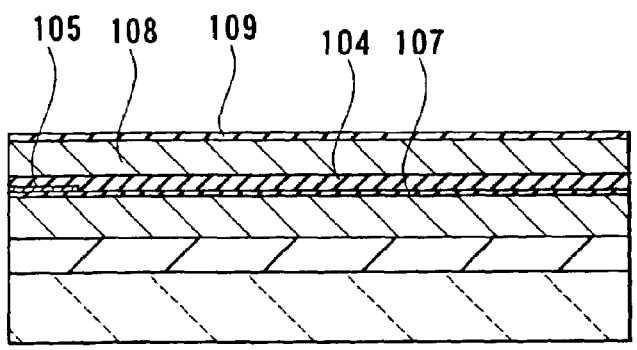
FIG. 15A and FIG. 15B are cross sections for illustrating a step that follows FIG. 14A and FIG. 14B.
Figure 15B:
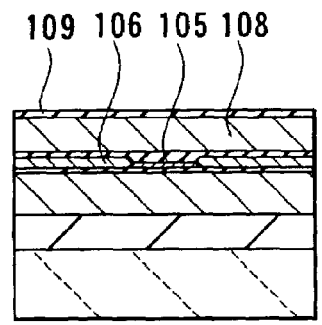
Figures 16A, 16B:
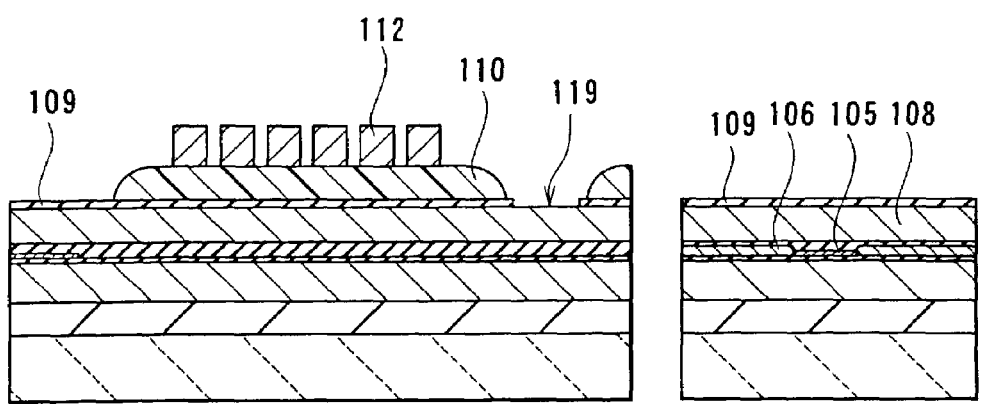
FIG. 16A and FIG. 16B are cross sections for illustrating a step that follows FIG. 15A and FIG. 15B.
Figure 19:
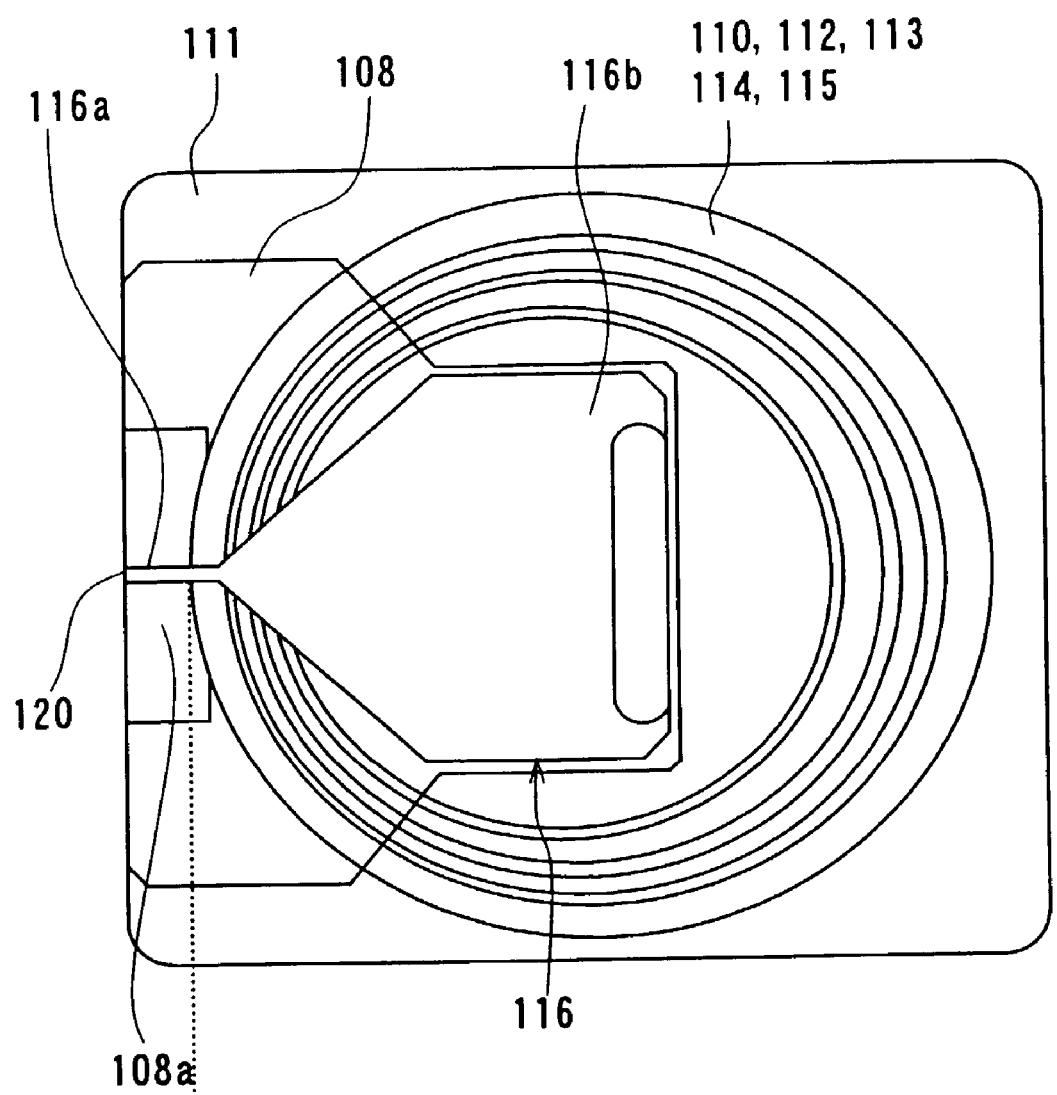
FIG. 19 is a top view of the related-art thin-film magnetic head.

Next, as shown in FIG. 12A and FIG. 12B, the photoresist layer 15 is formed into a specific pattern on the recording gap layer 9 and the coil 14. Heat treatment is then performed at a temperature of 250° C., for example, to flatten the surface of the photoresist layer 15.

Next, the top pole layer 16 made of a magnetic material and having a thickness of about 2 to 4 μm, for example, is formed for the recording head on the recording gap layer 9 and the photoresist layer 15. The top pole layer 16 is in contact with the magnetic layer 18b and magnetically coupled to the magnetic layer 18b through the contact hole 19.

Next, the recording gap layer 9 is selectively etched through dry etching, using the top pole layer 16 as a mask. Next, the pole portion 18a of the bottom pole layer is selectively etched by about 0.3 to 0.6 μm through argon ion milling, for example. A trim structure as shown in FIG. 12B is thus formed. Next, the overcoat layer 17 of alumina, for example, having a thickness of 20 to 40 μm is formed to cover the top pole layer 16. The surface of the overcoat layer 17 is then flattened and pads (not shown) for electrodes are formed on the overcoat layer 17. Finally, lapping of the slider is performed to form the air bearing surfaces of the recording head and the reproducing head. The thin-film magnetic head of the embodiment is thus completed.

In this embodiment, too, the top pole layer 16 has: the pole portion 16a located on a side of the air bearing surface 20; and the yoke portion 16b located in a position facing the coils 12 and 14. The shapes of the pole portion 16a and the yoke portion 16b are similar to those of the first embodiment.

In the second embodiment the pole portion 18a of the bottom pole layer and the insulating layers 11a and 11 form a flat surface on a side of the recording gap layer 9. The interface region between the pole portion 18a and the insulating layer 11a is zero throat height position TH0. In this embodiment the base of the apex made up of the photoresist layer 15 for insulating the coil 14 is located at a distance of 2 to 3 μm, for example, from zero throat height position TH0 toward the direction opposite to the air bearing surface 20.

The interface region between the pole portion 16a and the yoke portion 16b of the top pole layer 16 is located in a position facing the flat surface made up of the pole portion 18a of the bottom pole layer and the insulating layers 11a and 11, that is, on the flat recording gap layer 9. In this embodiment, in particular, the interface region between the pole portion 16a and the yoke portion 16b of the top pole layer 16 is located in the position corresponding to the interface region between the pole portion 18a of the bottom pole layer and the insulating layer 11a, that is, zero throat height position TH0.

According to this embodiment, the height of the apex is reduced, compared to the first embodiment. The top pole layer 16 is therefore fabricated with more precision.

According to the embodiment, the recording gap layer 9 and the insulating layer 11 having a desired thickness are placed between the coil 12 of the first layer and the coil 14 of the second layer. As a result, the insulation strength between the coils 12 and 14 is increased.

According to the embodiment, one of the CMP steps is eliminated and the fine top pole layer 16 is made of the single layer. Manufacturing costs are therefore reduced.

The remainder of the configuration, operations and effects of the embodiment are similar to those of the first embodiment.

The present invention is not limited to the foregoing embodiments but may be practiced in still other ways. For example, although the top pole layer 16 is made up of the single layer in the foregoing embodiments, the pole portion 16a and the yoke portion 16b may be made of separated layers.

In the foregoing embodiments the thin-film magnetic head is disclosed, comprising the MR element for reading formed on the base body and the induction-type magnetic transducer for writing stacked on the MR element. Alternatively, the MR element may be stacked on the magnetic transducer.

That is, the induction-type magnetic transducer for writing may be formed on the base body and the MR element for reading may be stacked on the transducer. Such a structure may be achieved by forming a magnetic film functioning as the top pole layer of the foregoing embodiments as a bottom pole layer on the base body, and forming a magnetic film functioning as the bottom pole layer of the embodiments as a top pole layer facing the bottom pole layer with a recording gap film in between. In this case it is preferred that the top pole layer of the induction-type magnetic transducer functions as the bottom shield layer of the MR element as well.

A base body having a concave is preferred for the thin-film magnetic head having such a structure. If the coils are formed in the concave of the base body, the thin-film magnetic head is further reduced in size.

Alternatively, the insulating layers formed between the thin-film coils forming the coils of the induction-type magnetic transducer may be all made of inorganic layers.

The invention may be applied to a thin-film magnetic head having only an induction-type magnetic transducer for performing both reading and writing.

According to the thin-film magnetic head or the method of manufacturing the same of the invention described so far, the first pole portion of the first magnetic layer and the insulating layer define the throat height, and form the flat surface on a side of the gap layer. The interface region between the second pole portion having a width that defines the recording track width and the second yoke portion having a width greater than that of the second pole portion is located in a position facing the flat surface made up of the first pole portion and the insulating layer. As a result, the pole width is precisely controlled and a sufficient overwrite property is obtained even if the pole width is reduced. Since the throat height is defined by the first pole portion and the insulating layer that make up the flat surface, the throat height is controlled with precision.

The edges of the second yoke portion closer to the second pole portion may each form a specific angle with the edges of the second pole portion, and extend outward in the direction of width. As a result, the pole width is more precisely controlled. In particular, if the specific angle is practically 90 degrees, the pole width is still more precisely controlled.

If the second pole portion and the second yoke portion are made of a single layer, manufacturing costs are reduced.

Obviously many modifications and variations of the present invention are possible in the light of the above teachings. It is therefore to be understood that within the scope of the appended claims the invention may be practiced otherwise than as specifically described.

What is claimed is:

1. A method of manufacturing a thin-film magnetic head comprising: a first magnetic layer and a second magnetic layer magnetically coupled to each other and each including at least one layer, the first magnetic layer including a first pole portion, the second magnetic layer including a second pole portion, the pole portions being opposed to each other and placed in regions of the magnetic layers on a side of a medium facing surface that faces toward a recording medium; a gap layer provided between the first pole portion and the second pole portion; and a thin-film coil at least part of which is placed between the first and second magnetic layers, the at least part of the coil being insulated from the first and second magnetic layers; wherein:

the first magnetic layer includes: the first pole portion that has a surface that faces toward the gap layer; and a first yoke portion magnetically coupled to the first pole portion, the first pole portion and the first yoke portion being made up of separate layers; and the second magnetic layer includes: the second pole portion having a width that defines a recording track width; and a second yoke portion magnetically coupled to the second pole portion and having a width greater than that of the second pole portion, the head further comprising an insulating layer provided between the gap layer and the first yoke portion, the insulating layer touching the first pole portion and having a surface that faces toward the gap layer, the method including the steps of:

forming the first magnetic layer;

forming the thin-film coil such that the at least part of the thin-film coil is located on a side of the first pole portion and between the gap layer to be formed later and the first yoke portion;

forming the insulating layer;

forming the gap layer; and forming the second magnetic layer; wherein:

the first pole portion and the insulating layer are formed such that an interface region between the first pole portion and the insulating layer defines a throat height, and that the surface of the first pole portion that faces toward the gap layer and the surface of the insulating layer that faces toward the gap layer together form one flat surface; and the second magnetic layer is formed such that an interface region between the second pole portion and the second yoke portion is located in a position that faces toward the one flat surface made up of the surface of the first pole portion and the surface of the insulating layer.

2. The method according to claim 1, wherein, in the step of forming the second magnetic layer, the second magnetic layer is formed such that edges of the second yoke portion on a side of the second pole portion extend outward in the direction of width, each forming a specific angle with edges of the second pole portion.

3. The method according to claim 2, wherein the specific angle is practically 90 degrees.

4. The method according to claim 1, wherein the interface region between the second pole portion and the second yoke portion is located in a position corresponding to the interface region between the first pole portion and the insulating layer in the step of forming the second magnetic layer.

5. The method according to claim 1, wherein the second pole portion and the second yoke portion are made up of a single layer in the step of forming the second magnetic layer.

6. The method according to claim 1, wherein the thin-film coil is divided and placed between the gap layer and the first yoke portion and between the gap layer and the second yoke portion in the step of forming the thin-film coil.

7. The method according to claim 1, wherein the insulating layer is formed after the first magnetic layer is formed, and processing is then performed to flatten the top surfaces of the first magnetic layer and the insulating layer.

* * * * *